United States Patent [19]

Smith, Jr.

[11] Patent Number: 4,970,105

[45] Date of Patent: Nov. 13, 1990

[54] FABRICS FOR PROTECTIVE GARMENT OR COVER

[76] Inventor: W. Novis Smith, Jr., 412 South Perth St., Philadelphia, Pa. 19147

[21] Appl. No.: 311,284

[22] Filed: Feb. 16, 1989

[51] Int. Cl.$^5$ ............................................. B32B 27/14
[52] U.S. Cl. ...................................... 428/198; 428/196; 428/197; 428/246; 428/252; 428/253; 428/267; 428/280; 428/282; 428/284; 428/287; 428/421; 428/422; 428/902
[58] Field of Search ............... 428/287, 267, 265, 253, 428/252, 198, 197, 196, 246, 253, 280, 282, 284, 421, 422, 902

[56] References Cited

U.S. PATENT DOCUMENTS

| | | | |
|---|---|---|---|
| 3,547,765 | 12/1970 | Snyder et al. | 428/422 |
| 4,331,729 | 5/1982 | Weber | 428/252 |
| 4,460,641 | 7/1984 | Barer et al. | 428/252 |
| 4,469,744 | 9/1984 | Grot et al. | 428/252 |
| 4,610,918 | 9/1986 | Effenberger et al. | 428/262 |
| 4,770,927 | 9/1988 | Effenberger et al. | 428/252 |
| 4,816,330 | 3/1989 | Freund et al. | 428/287 |

*Primary Examiner*—James Bell

[57] ABSTRACT

The invention provides a fabric for use in the manufacture of protective garments, containers and covers comprising an inner layer of a tear resistant, high tensile fabric and a film layer bonded on at least one surface of said high modulus fabric comprising a meltable polyhalogenated resin.

12 Claims, No Drawings

FABRICS FOR PROTECTIVE GARMENT OR COVER

FIELD OF THE INVENTION

The present invention relates to fabrics for protective garments and covers for use in hazardous environments. More particularly, the invention is concerned with light weight protective garments, containers and covers comprising a high tensile strength film or fiber which is bonded between films comprising a fusible or a meltable polyhalogenated hydrocarbon.

BACKGROUND OF THE INVENTION

Protective clothing of many types is now well known for many and varied uses, such as suits for industrial workers, suits for fireman, forest fire fighters, race car drivers and airplane pilots, and suits for use by military personnel, for protection from fire, vapors and harmful substances. Garments include not only complete, hermetic suits, but also individual garments such as trousers, jackets, gloves, boots, hats, head coverings, masks, etc.

Regulations resticting exposure to hazardous environments of various kinds, such as the Occupational Safety and Health Act, make it increasingly necessary to have better and more effective kinds of protective garments. In particular, certain requirements by the U.S. Coast Guard and related requirements by other U.S. government or organizations involve a total protective hermetic suit or envelope around the individual person or fireman. These situations involve cleaning up chemical spills or for fighting chemical fires where the chemical materials are unknown and presumed toxic.

The need for such encapsulating suits for "immediately dangerous to life and health (IDLH)" environments. These sutis must be air tight and worn with a self-contained breathing apparatus. The suit must be nonabsorbent, totally impermeable, and resistant to the widest range of chemicals and reagents. It should also be as fire resistant as possible. Since these suits are being worn by actively working individuals, they should also be flexible, abrasion resistant, light weight, and should maintain their impermeability while being used.

Such garments presently available are almost invariably of thick construction and heavy in weight, and are often fabricated at least in part from materials impermeable to water or water vapor, such as natural and synthetic rubbers and elastomers, chlorinated rubbers, etc.

Protective clothing comprised of laminates of films have the problem of forming "kinks" when bent so as to restrict movement and become cumbersome. Moreover, some of the protective clothing are porous and provide little protection against hazardous chemical vapors.

It is therefore desirable to provide a fabric which, in addition to being flame retardant, also possesses good abrasion resistance, flexibility and heat sealing properties.

U.S. Pat. No. 4,569,088 to Frankburg et al describes a protective garment for protection from high temperatures and occasional splashes of molten metal. The fabric comprises an inner fabric layer of a fibrous polyamide and surface layers of polytetrafluoroethylene fibers. However, the fabric is porous and does not provide any protection against hazardous vapors.

U.S. Pat. No. 2,840,881 describes fibrous structures comprised of a surface layer of nonwoven, intermingled polytetrafluoroethylene fibers and another layer of fibers other than polyetrafluoroethylene fibers. The structures are useful when a lubricating surface is required.

In order to maximize the impermeability of the fabric against all chemical substances and vapors, the plastic films used must be composed of a fusible or meltable polyhalogenated polymer. Additionally, the film itself must be without pin holes, fibers or porosity which lessen the barrier resistance of the actual film. Laminating the continuously formed film to a fabric gains the strength of the woven fabric without interferring with barrier properties of the film. It enhances the flexibility and resistance to failure from flexing of the total laminated fabric. Because of the absolute failsafe requirements of these chemical protective suits and for ease of putting the suit on or taking it off, a second layer of film is also used to form a sandwich. This maximizes the flexibility of a given construction with the total plastic film barrier being split into two layers and being easier to flex than one thick layer.

Note that polytetrafluorethylene (TFE) does not fuse. Sheets of TFE are hot pressed from the powder or fiber to form coalescence into sheets or films which have porosity and poor abrasion resistance.

SUMMARY OF THE INVENTION

Briefly, the invention provides a fabric for protective clothing, containers and covers for protection against hazardous liquids, vapors, and is flame retardant. More particularly, the fabric comprises an inner layer of an abrasion-resistant, high tensile fiber and a film layer bonded on at least one surface of said high tensile fabric comprising a fusible or meltable polyhalogenated resin.

The invention also relates to protective garments, containers and covers which are fabricated in part from the fabric of the invention.

DETAILED DESCRIPTION OF THE INVENTION

The fabric of the invention comprises a fabric layer of high tensile, abrasion-resistant fibers which is bonded on at least one side with a meltable polyhalogenated polyolefin resin.

Preferably, the polyhalogenated fluorine resin in a fluorinated ethylene perfluoroalkyl vinyl ether copolymer resin (PFA) or perfluoroethylene perfluorinated propylene copolymer (FEP). Advantageously, the resin is a polymer of the formula:

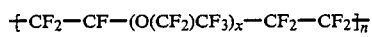

or

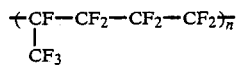

The polyhalogenated ethylene resins are commercially available and are sold by Dupont, Wilmington, Delaware under the trademarks TYZEL, TEFLON and TEDLAR, and by Allied Chemical Company, Morristown, N.J. under the trademarks HALAR and ACLOR.

Preferably, the halogen components of the ethylene resin are fluoro and/or chloro. Also, it is critical that the ethylene resin is meltable and film forming. The resins which are meltable between the temperatures of about 175° to 350° C. are particularly suitable for manufacturing reasons.

The thickness of the polyhalogenated ethylene resin film is generally in the range about 10 to 125 micrometers (about 0.4 to 10 mils), preferably about 50 to 125 micrometers. The total thickness of the fabric is generally about 10–20 mils, preferably about 14 mils. Providing a layer on each side of the fabric provides maximum protection. The high tensile fibers which may be utilized in the present invention include polyamides such as poly (m-phenylene isophthalamide, poly (p-phenylene terephthalamide (Kevlar), poly (m-phenylene terephthalamide (Nomex); nylon, polyethylene terphthalate (PET) blends of these fibers with polybenzamidazole and oxidized polyacrylonitrile fibers.

The inner fabric may be woven, including e.g. plain and upstop weaves, knitted, non-woven, felted, spun bonded or porous fabric.

The inner fabric is required to provide flex resistance and tear strength, and to prevent damage to the bottom surface film in the event the outer film is punctured to prevent exposure by the wearer to toxic vapors.

The inner fabric is preferably bonded to the outer film by an adhesive, preferably a flexible adhesive. Preferable adhesive compositions are ethylene/vinyl acetate, urethanes, polyester, and ethylene/acrylic ester copolymers such as described in U.S. Pat. No. 4,322,516 which is incorporated herein by reference.

The films may be bonded to the fabric by any convenient method such as calendering or applying a solution of adhesive composition to the fabric and subsequently evaporating the solvent. Heat sealable coated fabrics having good flame retardant and abrasion resistance properties with improved flexibility are obtained when the strike-in of the composition into the web of the fabric is controlled. An improved method of bonding the film to the adhesive composition to form a solution comprising about 20–50% solids; casting this solution onto a release substrate or roll in an amount which upon drying produces an even thickness film having a weight of about one to four ounces per square yard; contacting the film to the roll or release substrate. The fabric to be bonded is then contacted to the side of the film with the adhesive and heat and pressure are applied thereto for a dwell time sufficient to bond the film to the fabric by means of the adhesive without undue strike-in of the film into the fabric. Dwell times of about 10 seconds are adequate at 400° F. and 30 psig, for bonding the film to the fabric, yet at the same time minimizes strike-in of the coating and resultant stiffening of the fabric.

Although the invention has been described with preferred embodiments, it is to be understood that variations and modifications may be employed without departing from the concept of the invention as defined in the following claims.

What is claimed is:

1. A fabric for protective clothing, containers and covers for protection against hazardous liquids and vapors consisting of an inner layer of an abrasion resistant, high modulus fabric and a film layer bonded on at least one surface of said high modulus fabric, said film layer being adhesively bonded, comprising a fusible meltable polyhalogenated ethylene resin selected from the group consisting of $$-[CF_2-CF-(O(CF_2)CF_3)_x-CF_2-CF_2-]_n$$

and $$(CF-CF_2-CF_2-CF_2)_n,$$
$$|$$
$$CF_3$$

said resin having a melting point between about 175° to 350° C. whereby said fabric prevents the passage of hazardous vapors.

2. The fabric according to claim 1 wherein said polyhalogenated ethylene resin comprises a fluorinated ethylene perfluoroalkyl vinyl ether copolymer resin.

3. The fabric according to claim 1 wherein said polyhalogenated ethylene resin comprises a fluorinated ethylene propylene copolymer resin.

4. The fabric according to claim 1 wherein said high tensile fabric comprises a fiber selected from the group consisting of polyethylene terephthalate, poly p-phenylene terephthalamide, poly m-phenylene terephthalamide, polybenzamidazole, and oxidized polyacrylonitrile.

5. The fabric according to claim 1 wherein said film is bonded to said fabric with a contact adhesive.

6. The fabric according to claim 1 wherein said fabric and said film are intermittently bonded.

7. The fabric according to claim 1 comprising a high tensile fabric sandwiched between two layers of a polyhalogenated ethylene resin.

8. A protective garment fabricated in part from the fabric according to claim 1.

9. The protective garment fabricated in part from the fabric according to claim 2.

10. The protective garment fabricated in part from the fabric according to claim 3.

11. The protective garment fabricated in part from the fabric according to claim 4.

12. A fabric for protective clothing, containers and covers for protective clothing, containers and covers for protection against the penetration of hazardous liquids and vapors comprising an inner layer of an abrasion resistant, high modulus fabric and a film layer consisting of a polymer of the formula:

$$[CF_2-CF-(O(CF_2)CF_3)-CF_2-CF_2]_n$$

adhesively bonded into each side of said fabric layer, said polymer having a melting point of about 175° to 350° C. said fabric layer being substantially free of strike-in of said film.

* * * * *